3,309,059
HYDRAULIC TURBINES
Michael Braikevitch, Netherton, England, assignor to The English Electric Company Limited, London, England, a British company
Filed Nov. 30, 1964, Ser. No. 414,636
Claims priority, application Great Britain, Dec. 5, 1963, 48,074/63
24 Claims. (Cl. 253—117)

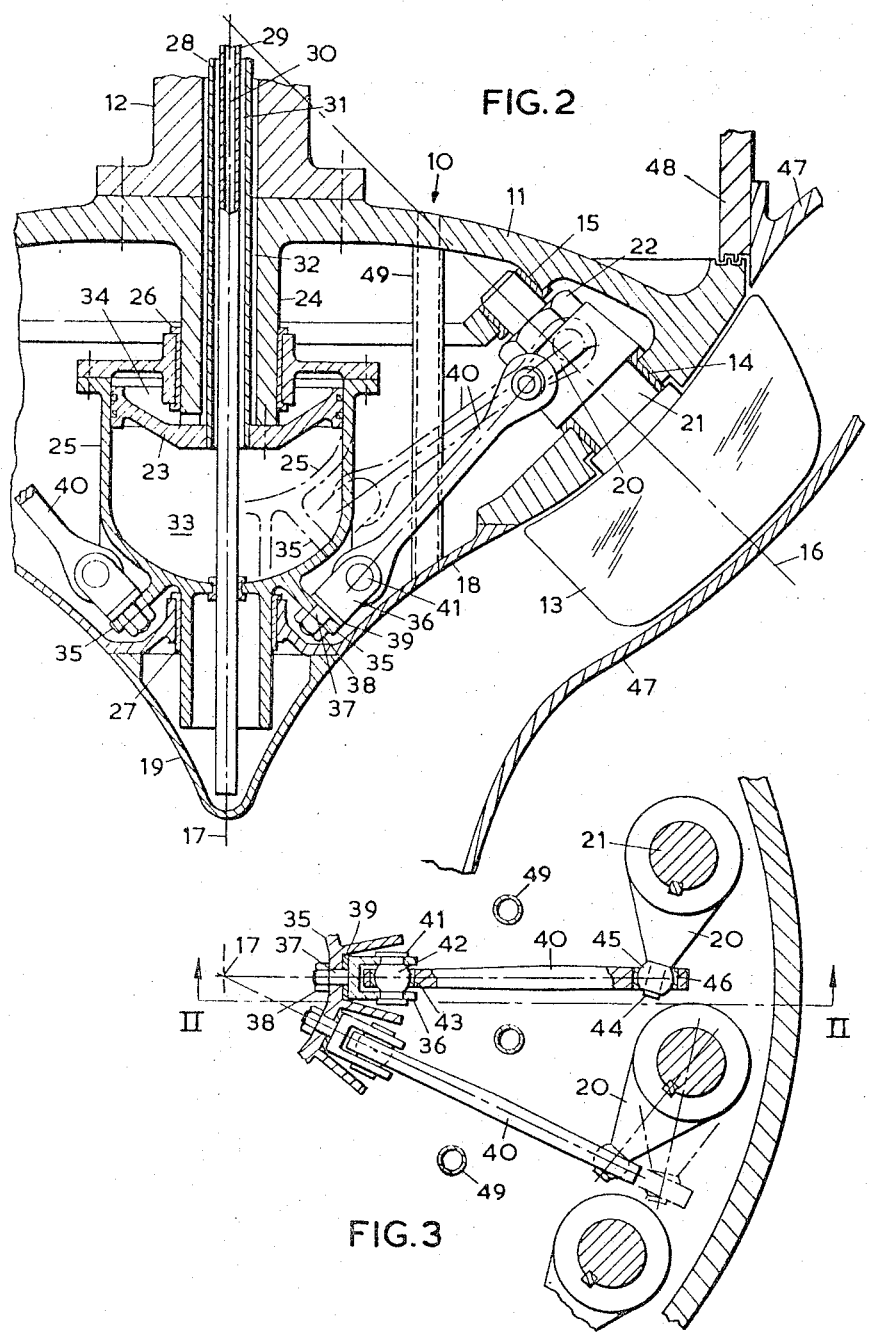

This invention relates to hydraulic turbines and reversible pump turbines, hereinafter referred to as hydraulic machines.

According to the invention, a hydraulic turbine or reversible pump turbine comprises a runner having a plurality of runner blades pivotally mounted in said runner to rotate about axes which meet at a common point on the axis of rotation of said runner but which do not lie in one plane, and including a plurality of ducts connected between a supply of air and the surface of the runner downstream of the runner blades.

A turbine in accordance with the invention will hereinafter be particularly described by way of example with reference to the accompanying drawings of which:

FIG. 2 shows a cross-section through the runner and part of the stator of the turbine;

FIG. 3 shows a conical developed view of part of FIG. 2, the line II—II indicating the section on which FIG. 2 is taken.

Figure 1:
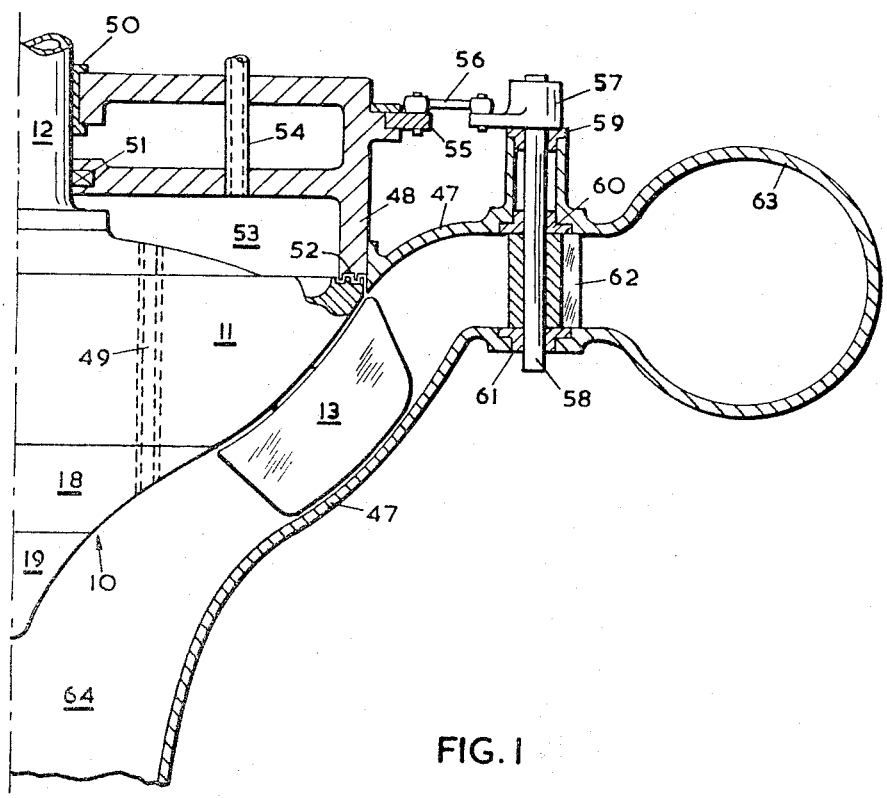
FIG. 1 shows the runner and a cross-section through the spiral casing and part of the stator of a turbine.

Referring to FIG. 1, a part of the turbine stator 48 houses a turbine bearing 50 in which a hollow shaft 12 fixed to the runner 10 is arranged to rotate. The turbine stator 48 houses a shaft gland sealing ring 51 which bears against the shaft 12, and the stator 48 forms in conjunction with the periphery of the main body portion 11 of the runner 10 a labyrinth seal 52. The turbine stator 48, main body portion 11, shaft gland sealing ring 51 and labyrinth seal 52 define an annular cavity 53 which is connected by a plurality of pipes 54 through the turbine stator 48 either to atmosphere or to a pressure air supply (not shown).

The turbine stator 48 also provides a mounting for a rotatable regulating ring 55 which is connected by a plurality of links 56 to regulating levers 57 attached to trunnions 58. Bearings 59, 60, 61 are provided in the water retaining casing 47 of the turbine and the trunnions 58 are mounted in them. A guide vane 62 is connected to each trunnion and operates in the water passage defined by the casing 47. A spiral casing 63 is attached to the casing 47 upstream of the guide vanes 62.

Downstream of the guide vanes 62 and within the water passage of the turbine are a plurality of variable-pitch blades 13 attached to the runner 10 of the turbine. Downstream of the blades 13 is the draft tube 64. A number of ducts 49 connect the water space between the blades 13 and the draft tube 64 with the space 53.

Referring to FIGS. 2 and 3 the runner 10 comprises a main body portion 11, a frustro-conical portion 18 and a nose portion 19. The variable-pitch blades 13 are attached to trunnions 21 which are arranged to rotate in bearings 14, 15 mounted in the main body portion 11 of the runner so that the blades 13 rotate about axes 16 which meet at a common point on the axis of rotation of the runner. Operating levers 20 are keyed to the trunnions 21 and are held in position by nuts 22.

A servo-motor comprising a fixed cylindrical piston 23 and a cooperating cylinder 25 are arranged with their axes coincident with the axis 17 of the runner 10. The fixed piston 23 is secured to an extension 24 of the body portion 11 and the movable cylinder 25 is arranged to slide in bearings 26, 27 mounted respectively on the extension 24 of the main body portion 11 and on a diaphragm extending inwardly from the frustro-conical portion 18.

The hollow shaft 12 and extension 24 house two concentric tubes 28, 29 defining three conduits 30, 31, 32 one of which 30 communicates with the interior of the nose portion 19, another of which 31 communicates with the space 33 on the lower side of the piston 23 and the third of which 33 communicates with the space 34 on the upper side of the piston 23 and within the cylinder 25.

The cylinder 25 is formed with a crosshead device in the form of a conical flange 35. Forked members 36, equal in number to the number of blades 13, are attached to the conical flange 35 by stud portions 37 and nuts 38. Packing washers 39 are arranged adjacent the conical flange 35. Each forked member 36 is joined to its corresponding operating lever 20 by a link 40. Each link 40 and forked member 36 are joined by the engagement of a part-spherical housing 43 in each link 40 with a part-spherical member 42 attached to each forked member 36 by a cylindrical pin 41. Similarly each operating lever 20 is attached to its corresponding link 40 by a part-spherical member 45, which is attached to the operating lever by a cylindrical pin 44, and which engages a part-spherical housing 46 formed in the link 40. Due to the construction described each link 40 is capable of limited universal movement relative to corresponding forked member 36 and operating lever 20 and in addition a considerable amount of space within the runner is not occupied by the operating mechanism. There is therefore space between adjacent links 40 to dispose within the runner a plurality of ducts 49 connecting the annular cavity 53 above the runner 10 with the surface of the frustro-conical portion 18 of the runner.

In operation, when liquid under pressure is supplied to the space 34 the cylinder 25 moves upwards as shown in FIG. 2, carrying with it the crosshead 35, from the position shown in solid lines to the position shown in dotted lines. This supplies a force to the links 40 which is transmitted to the operating levers 20 to rotate the runner blades 13. Since the links 40 lie approximately in planes at right angles to the corresponding axes 16 of the runner blades 13, the force is applied to the operating levers 20 approximately in their planes of movement.

Moreover since the links 40 lie substantially in planes passing through the axis of rotation 17 of the runner, axial movement of the servo-motor cylinder 25 transmits the force through the links 40 to the operating levers 20 without causing any substantial torque on the servo-motor cylinder 25 which would tend to cause it to rotate about the axis 17.

Variations of the thickness of packing washers 39 allow the initial position of the runner blades 13 to be adjusted individually.

Referring again to FIG. 1, in operation of the turbine water will flow from the spiral casing 63, past guide vanes 62 and variable-pitch runner blades 13 to the draft tube 64. In certain circumstances the water pressure downstream of runner blades 13 may be below that of the atmosphere. If therefore pipes 54 are connected to atmosphere air will flow through pipes 54 into cavity 53. In addition high pressure water will leak through labyrinth seal 52 into cavity 53. Air and water will therefore pass through ducts 49 to the underside of the runner 10.

If the water pressure at the lower end of duct 49 is above atmospheric pressure, pipes 54 are connected to a suitable pressure air supply so that air will still flow to cavity 53 and through ducts 49 to the underside of the runner 10.

It has been found that aeration of the space below the runner counteracts rough running due to cavitation.

Figure 4:
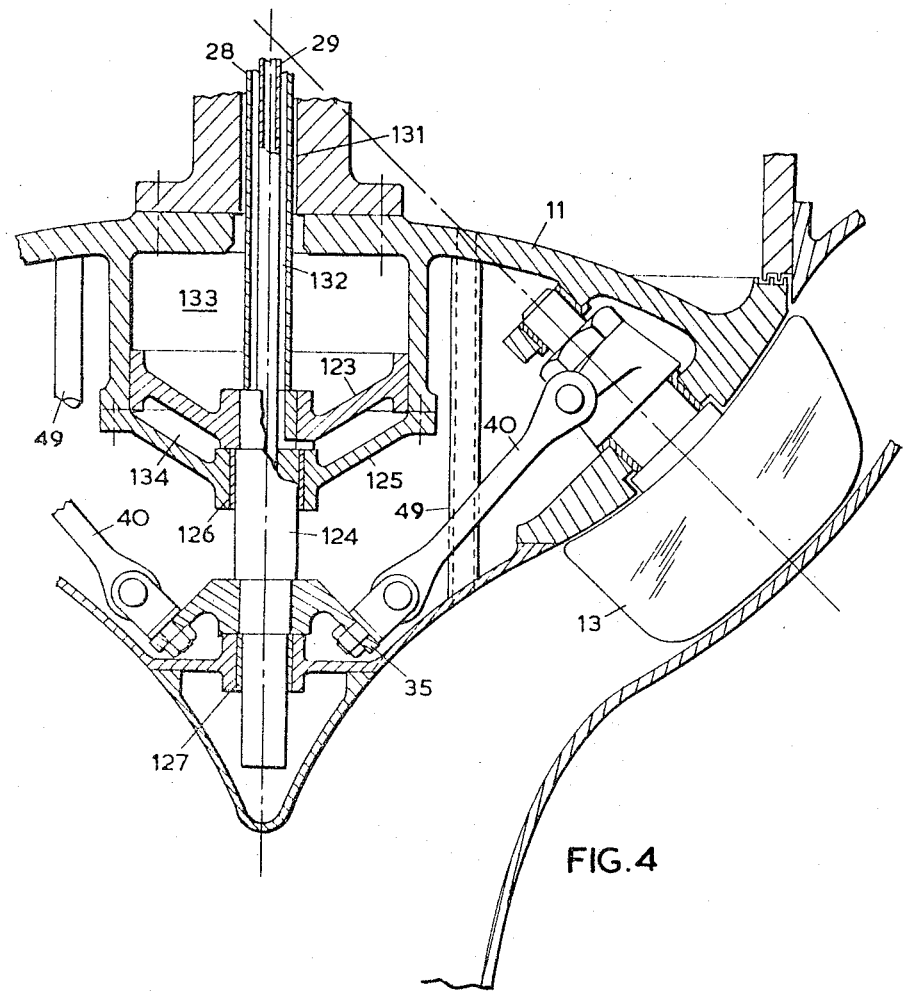
FIG. 4 shows a view corresponding to FIG. 2 of a modification.

Referring now to FIG. 4, there is shown a modification in which, instead of the crosshead device being connected to a movable cylinder and the piston remaining stationary, the cylinder 125 is stationary, part of it being formed integrally with the body portion 11. The piston 123 is movable relative to the body portion and the crosshead device 35 is mounted on a piston rod 124 to which the piston 123 is secured. The piston rod is supported in bearings 126, 127.

In this case the connections are reversed as compared with FIG. 2, the supply of liquid through conduit 131 to space 133 on the upper side of piston 123 causing the crosshead 35 to move downward as seen in FIG. 4, and the supply of liquid through conduit 132 to space 134 on the lower side of the piston causing the crosshead to move upward.

Moreover the servo piston and cylinder may be outside the body of the runner and connected to a crosshead device, through a piston rod.

What I claim as my invention and desire to secure by Letters Patent is:

1. A hydraulic machine comprising a stator; a shaft rotably mounted in said stator; a hollow runner hub fixed to said shaft so as to rotate therewith; a plurality of runner blades; a plurality of trunnions connected to said runner blades and mounted on said hollow runner hub to rotate about non-coplanar axes which meet at a common point on the axis of rotation of said hollow runner hub; a plurality of operating levers, one connected to each trunnion inside said hollow runner hub; crosshead means movable along the axis of rotation of said hollow runner hub and spaced below said operating levers; means to control the movement of said crosshead means; a plurality of link members; universal joint means at each end of said link members, and connecting said link members to said operating levers and to said crosshead means respectively; a plurality of ports in the surface of said hollow runner hub downstream of said runner blades; means defining a source of air above said hollow runner hub; a plurality of ducts, each of said ducts passing between an adjacent pair of link members and having an upper and a lower end, the lower end of each of said ducts terminating in one of said ports and means connecting the upper end of each of said ducts to said source of air.

2. A hydraulic machine as claimed in claim 1, wherein said means to control the movement of said crosshead means comprises a fluid operated reciprocating servomotor, including a first part, a second part movable relative to said first part along the axis of rotation of said hollow runner hub, and means to effect movement of said second part relative to said first part; said second part connected to said crosshead means.

3. A hydraulic machine as claimed in claim 2, wherein said first part comprises a cylinder, said second part comprises a piston acting within said cylinder.

4. A hydraulic machine as claimed in claim 3, wherein said fluid operated servomotor is located outside said hollow runner hub, a piston rod, carried by said piston, extends axially through said shaft into said hollow runner hub, the end of said piston rod remote from said piston is connected to said crosshead means.

5. A hydraulic machine as claimed in claim 4, including means to provide fluid pressure on one side of said piston, to move said piston within said cylinder.

6. A hydraulic machine as claimed in claim 3, including a seal between said stator and said hollow runner hub and a seal between said stator and said shaft, so that an annular cavity is defined between said stator and said hollow runner hub, the upper end of each of said ducts opening into said annular cavity.

7. A hydraulic machine as claimed in claim 6 including at least one pipe through said stator, one end of said pipe opening into said annular cavity and the other end communicating with said source of air.

8. A hydraulic machine as claimed in claim 3, wherein there is one of said ducts between each adjacent pair of said link members.

9. A hydraulic machine comprising a stator; a shaft rotatably mounted in said stator; a hollow runner hub fixed to said shaft so as to rotate therewith; a plurality of runner blades; a plurality of trunnions connected to said runner blades and mounted on said hollow runner hub to rotate about non-coplanar axes which meet at a common point on the axis of rotation of said hollow runner hub; a plurality of operating levers, one connected to each trunnion inside said hollow runner hub; crosshead means; a fluid operated reciprocating servomotor centrally disposed within said hollow runner hub and including a first part connected to said hollow runner hub and a second part movable relative to said first part along the axis of rotation of said hollow runner hub, and means to effect movement of said second part relative to said first part; said second part being connected to said crosshead means; a plurality of link members; universal joint means at each end of said link members, and connecting said link members to said operating levers and to said crosshead means respectively; a plurality of ports in the surface of said hollow runner hub downstream of said runner blades; means defining a source of air above said hollow runner hub, a plurality of ducts, each of said ducts passing between an adjacent pair of link members and having an upper and a lower end, the lower end of each of said ducts terminating on one of said ports and means connecting the upper end of each of said ducts to said source of air.

10. A hydraulic machine as claimed in claim 9, wherein said first part comprises a piston, said second part comprises a cylinder co-operating with said piston.

11. A hydraulic machine as claimed in claim 10, including means to provide fluid pressure on one side of said piston to move said cylinder relative to said piston.

12. A hydraulic machine as claimed in claim 11, wherein said means to provide fluid pressure on one side of the piston comprises inner and outer concentric pipes extending axially through said shaft and said hollow runner hub, the outer pipe communicating with the space above the piston and the inner pipe communicating with the space below the piston.

13. A hydraulic machine as claimed in claim 12, wherein said crosshead means is spaced below said operating levers.

14. A hydraulic machine as claimed in claim 9, wherein said first part comprises a cylinder, said second part comprises a piston acting within said cylinder and including means to provide fluid pressure on one side of said piston, to move said piston within said cylinder.

15. A hydraulic machine as claimed in claim 14, wherein said means to provide fluid pressure on one side of the piston comprises inner and outer concentric pipes extending axially through said shaft and said hollow runner hub, the outer pipe communicating with the space above the piston and the inner pipe communicating with the space below the piston.

16. A hydraulic machine as claimed in claim 15, wherein said crosshead means is axially spaced below said operating levers.

17. A hydraulic machine as claimed in claim 11, including a seal between said stator and said hollow runner hub and a seal between said stator and said shaft, so that an annular cavity is defined between said stator and said hollow runner hub, the upper end of each of said ducts opening into said annular cavity.

18. A hydraulic machine as claimed in claim 17, including at least one pipe through said stator, one end of said pipe opening into said annular cavity and the other end communicating with said source of air.

19. A hydraulic machine as claimed in claim 11, wherein there is one of said ducts between each adjacent pair of said link members.

20. A hydraulic machine comprising a stator; a shaft rotatably mounted in said stator; a hollow runner hub fixed to said shaft so as to rotate therewith; a plurality of runner blades; a plurality of trunnions connected to said runner blades and mounted on said hollow runner hub to rotate about non-coplanar axes which meet at a common point on the axis of rotation of said hollow runner hub; a plurality of operating levers, one connected to each trunnion inside said hollow runner hub; crosshead means movable along the axis of rotation of said hollow runner hub; means to control the movement of said crosshead means; a plurality of link members; universal joint means at each end of said link members, and connecting said link members to said operating levers and to said crosshead means respectively; a plurality of ports in the surface of said hollow runner hub downstream of said runner blades; means defining a source of air above said hollow runner hub; a plurality of ducts; each of said ducts passing between an adjacent pair of link members and having an upper and a lower end, the lower end of each of said ducts terminating in one of said ports and means connecting the upper end of each of said ducts to said source of air.

21. A hydraulic machine as claimed in claim 20, including a seal between said stator and said hollow runner hub and a seal between said stator and said shaft, so that an annular cavity is defined between said stator and said hollow runner hub, the upper end of each of said ducts opening into said annular cavity.

22. A hydraulic machine as claimed in claim 21, including at least one pipe through said stator, one end of said pipe opening into said annular cavity and the other end communicating with said source of air.

23. A hydraulic machine as claimed in claim 20, wherein there is one of said ducts between each adjacent pair of said link members.

24. A hydraulic machine as claimed in claim 20, wherein said means to control the movement of said crosshead means comprises a fluid operated reciprocating servomotor including a first part, a second part movable relative to said first part along the axis of rotation of said hollow runner hub, and means to effect movement of said second part relative to said first part; said second part connected to said crosshead means.

References Cited by the Examiner

UNITED STATES PATENTS

| | | | |
|---|---|---|---|
| 1,860,618 | 5/1932 | Nagler. | |
| 1,947,654 | 2/1934 | Moody | 253—148 |
| 2,079,258 | 5/1937 | Kerr | 253—117 |
| 2,687,280 | 8/1954 | Sharp | 253—155 X |
| 3,132,839 | 5/1964 | Haekal | 253—31 |

FOREIGN PATENTS

| | | |
|---|---|---|
| 620,845 | 5/1961 | Canada. |
| 489,082 | 1/1954 | Italy. |

MARTIN P. SCHWADRON, *Primary Examiner.*

JULIUS E. WEST, *Examiner.*

E. A. POWELL, JR., *Assistant Examiner.*